July 6, 1948.　　　　　G. E. SELDON　　　　　2,444,537
AUTOMOTIVE AIR CONDITIONING APPARATUS
Filed June 2, 1944　　　　　　　　　　　　　2 Sheets-Sheet 1

INVENTOR.
GEORGE E. SELDON
BY Bertram H. Mann Jr.

July 6, 1948.　　　　G. E. SELDON　　　　2,444,537
AUTOMOTIVE AIR CONDITIONING APPARATUS
Filed June 2, 1944　　　　　　　　　　2 Sheets-Sheet 2

INVENTOR.
GEORGE E. SELDON

Patented July 6, 1948

2,444,537

UNITED STATES PATENT OFFICE 2,444,537

AUTOMOTIVE AIR CONDITIONING APPARATUS

George E. Seldon, Kirkwood, Mo.

Application June 2, 1944, Serial No. 538,481

4 Claims. (Cl. 62—117)

This invention relates to means for air conditioning the passenger space of an automotive vehicle, particularly of the type driven by an internal combustion engine.

Although there has been considerable demand for a practical and effective cooling apparatus for automobiles, none has had substantial use for a variety of reasons. Where any of the usual commercial refrigerants or coolants are used, the refrigerating circuit must be kept in tightly sealed condition to prevent the escape of the gas or liquid. This is difficult or impossible of accomplishment in an automobile because of the prevalance of dust and grit and the vibration strains normally incident to the running of the vehicle.

Although many cars are provided with hot water heaters which include heat exchanging coils located in the vehicle bodies, this coil cannot be readily used in a refrigerating system since it must be thoroughly dried and cleaned before it can be effectively used with commercial refrigerants. Space limitations usually prevent the mounting of an additional evaporator coil within the passenger compartment. Whereas water may be used in a refrigerating circuit, much larger volumes thereof must be handled than in the case of other coolants such as ammonia, sulphur dioxide, methyl chloride, and the like and, furthermore, the supply of water coolants is subject to freezing in cold weather.

It is an object of my invention to provide air conditioning apparatus, particularly for automotive vehicles in which tight pressure seals are not important.

Another object of my invention is to provide an automobile cooling apparatus which is adapted to use water as the coolant.

Another object is to provide air conditioning apparatus for vehicle passenger space in which the heat exchange coil can be selectively connected to heating or cooling connections and in which it is unnecessary to thoroughly dry and clean the coil when the change over is made.

Another object is to provide means for utilizing moisture in the engine exhaust for replenishing the supply of water coolant and, thereby, avoiding the necessity of an excessively large supply tank or an hermetically sealed system.

Another object is to provide an automobile cooling apparatus in which the reserve supply of coolant is maintained at substantially atmospheric pressure so as to further avoid the necessity of tightly sealed piping and joints.

These objects and other more detailed objects hereafter appearing are attained substantially by the apparatus illustrated in the accompanying drawing in which Fig. 1 is a plan view of one form of the apparatus and showing parts of the vehicle engine.

Figure 1:
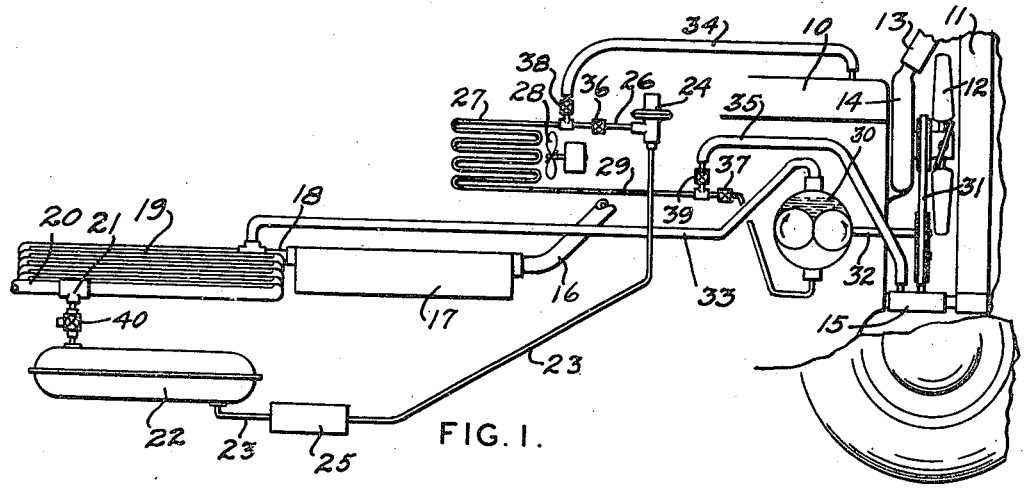

The apparatus in the figures is adapted for use in conjunction with an internal combustion engine of the water jacketed type. The engine is shown at 10 and is provided with the usual radiator 11 and fan 12. The top of the radiator is connected by a hose 13 to the water pump 14 operated by the fan shaft, and a hose 15 connects the bottom of the radiator with the engine. Cooling water is circulated in a well known manner through the radiator, water pump, and the water jacket of the engine. A portion of the engine exhaust pipe is shown at 16 terminating in the muffler 17.

In the form in Fig. 1, a condenser 19 is carried at the rear of the muffler and connected thereto at 18. The condenser receives exhaust discharged from the muffler and conducts the same to the atmosphere through the tail pipe 20. A by-pass pipe 21, at the lowest point in the condenser, serves for draining collected moisture into a collector receptacle 22. This receptacle is connected by a pipe 23 to an expansion valve 24 mounted adjacent the engine. A decontaminator device 25 may be interposed in tube 23 for removing sulphuric acid and other foreign matter from the condensed exhaust moisture. Metering valve 24 of the pressure type is connected by a tube 26 to a heat exchanger coil 27 which is conveniently mounted in the passenger space in the vehicle. A fan 28, conveniently operated by an electric motor, is positioned adjacent coil 27 for causing rapid circulation of air thereover. The opposite extremity of heat exchanger coil 27 is connected by a tube 29 to the inlet side of a gear pump 30 operated from fan belt 31 through shafting 32, represented conventionally. The outlet side of pump 30 is connected by piping 33 to condenser 19, adjacent muffler 17, for the recovery of the vapor. In operation, this type of pump is sealed with oil, shown trapped above the gears, and is very efficient for pumping vapors.

Heat exchanger 27 is also connected by pipes or tubes 34 and 35 to the water jacket of the engine. Cut-off valves 36 and 37 are provided in the cooling connection and valves 38 and 39 are located in the heating connection.

This apparatus operates as follows:

During warm weather, valves 36 and 39 in heating pipes 34 and 35 will be closed to prevent the entry of hot water from the engine cooling jacket into heat exchanger 27. Valves 36 and 37 will be open so as to connect coil 27 to the cooling circuit. Water condensed from the exhaust will collect in receptacle 22 and will be drawn by pump 30 through expansion valve 24 where it will be vaporized, and through evaporator coil 27 which, thereby, will be cooled and which will cool the air circulated thereover by fan 28. Water vapors discharged from the gear pump will be returned through piping 33 to the condenser and recollected in vessel 22.

Figures 3, 4:
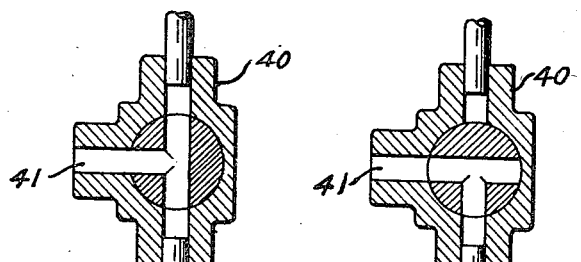
Figs. 3 and 4 are detail sections showing a valve which may be inserted between the condenser and collector in different positions.

Any ice formed in the collector vessel will soon thaw after the engine is started because of its proximity to the warm exhaust in condenser 19. However, this receptacle may be emptied for protection in cold weather by the inter-position of a manual, three-way valve 40 in the connection between tail pipe 20 and the receptacle, as shown in Figs. 1, 3 and 4. In Fig. 3, the valve is in its summer driving position in which the condenser is connected to receptacle 22 for the collection of condensed vapors. A vent 41 provides for relief to the atmosphere of exhaust gases by-passed around tail pipe 20. In the winter position of Fig. 4, the valve is turned to cut off connection between the condenser and collector so that no more water will be collected from the exhaust pipe. Air is swept through vent 41 and the receptacle to aid pump 30 in drawing all liquid therefrom. Such liquid is discharged into the atmosphere through pump outlet connection 33, the condenser, and tail pipe 20. For winter driving, valves 36 and 37 are closed and valves 38 and 39 opened to change coil 27 from a cooler to a heater. Also, pump 30 may be disconnected, if desired.

Figure 2:
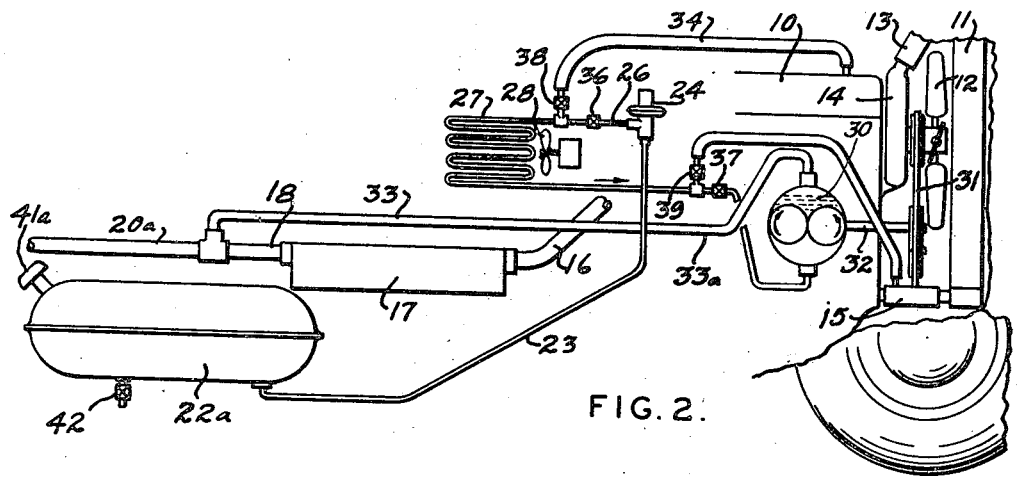
Fig. 2 is a similar view showing a modification.

In Fig. 2, a larger receptacle 22a is provided for water and has a filling opening 41a so that water can be added at regular intervals. In this form, discharge pipe 33a opens directly into the atmosphere or, as shown, into exhaust tail pipe 20a. This arrangement is convenient and practical, where water is used as the coolant, because of its cheapness. It is only necessary to keep tank 22a supplied with water, and this can be added each time the gasoline supply is replenished, together with checking of the radiator, oil supply, and tire pressure. Water can be drained from the tank for winter driving through a drain cock 42. The operation of the form in Fig. 2 is identical with that of Fig. 1 except that no water is recovered from the exhaust and the supply of coolant must, therefore, be constantly replenished.

Figure 5:
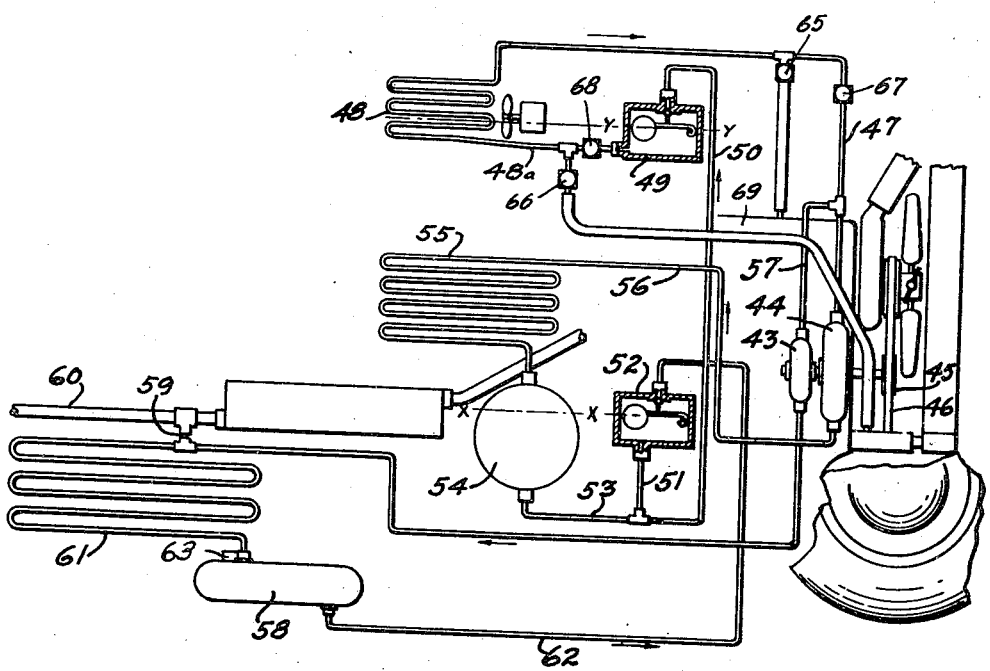
Fig. 5 is a generally diagrammatic view of a third form of refrigerating apparatus.

The form in Fig. 5 includes a pair of pumps 43 and 44 (preferably oil-sealed gear pumps, as in the previous forms) mounted co-axially at a convenient location adjacent engine block 69 for operation of driving pulley 45 by the fan belt 46. Relatively large pump 44 has its inlet connected by a tube 47 to evaporator coil 48 in the compartment to be air-conditioned and thence by a tube 48a to the outlet of a constant level chamber 49. The float valve controlled inlet of this chamber is connected by tubes 50, 51 to the outlet of what I term the "make-up water" constant level chamber 52. The outlet of the chamber 52 is also connected by a tube 53 to a collector 54 which receives water from condenser 55. A tube 56 connects the condenser to the outlet of pump 44 to complete a closed refrigerating circuit. Constant level chamber 49 holds the water surface in coil 48 at line $y-y$ so that evaporation and cooling occurs in the coil.

In order to remove air from the fluid in the closed circuit and thereby to improve the efficiency of the system, smaller gear pump 43 has its suction side connected to the said closed system by a tube 57. This pump discharges into a condenser coil 61 which also receives a part of the engine exhaust through a by-pass connection 59 from tail pipe 60. The by-passed exhaust is vented at 63 and the condensed moisture is collected in a vessel 58 and thence is returned through tube 62 to "make-up" chamber 52. The auxiliary circuit, therefore, serves to replenish the supply of coolant water and also to reduce the working pressure in the main circuit so as to draw off air which may be trapped therein.

For operation in warm weather, valves 65 and 66 will be closed to cut off radiator water from the system and valves 67 and 68 opened. Water normally stands in collector 54 and bowl 52 at the level $x-x$ to which level the closed system is initially charged. Operation of large capacity pump 44 creates positive pressure in collector 54 and forces water through pipe 56 to fill upper bowl 49 to the level $y-y$. Since the outlet of bowl 49 is restricted, a greatly reduced pressure exists in pipe 48a and coils 48 so that water therein is evaporated and the ambient temperature thereby reduced. The vapor is drawn into pump 44 for redelivery to coils 55 where it is condensed and returned to collector 54. A portion of the vapors are drawn into smaller pump 43 and discharged to condenser 61 which also receives a portion of the exhaust gases from tail pipe 60. Condensate from this source is available to be forced into "make-up water" bowl 52 in case the level therein drops enough to open the float valve because of the loss of moisture from the closed system. Pump 44 functions to eliminate air from the closed system since collector 58 and bowl 52 serve as traps to prevent the return of air through pipe 62. Connection 59 between tail pipe 60 and condenser 61, and also exhaust relief opening 63 are restricted so that positive pressure can be maintained by smaller pump 43 in the condenser and in collector 58 for forcing coolant into float chamber 52 when its float valve is open.

The three-way valve shown in Figs. 3 and 4, of course, may be applied with advantage in Fig. 5 between either or both of condensers 61 and 55 and collectors 58 and 54, respectively, to facilitate draining the collectors.

The various units of the apparatus may take other forms, though it is essential that the compressor or pump be of the type adapted to handle the large volumes of water vapor necessary to produce adequate cooling. A high speed gear pump is especially adapted for this purpose. Since the escape of refrigerant cannot adversely affect either the occupants of the vehicle or the operator of the apparatus, tight seals are not necessary around the compressor shafts. The invention may be modified in various respects as will occur to those skilled in the art and exclusive use of all modifications as come within the scope of the appended claims is contemplated.

I claim:

1. In combination with an internal combustion engine, air conditioning apparatus comprising a high capacity compressor arranged for operation by the engine, an evaporator coil connected to the suction side of said compressor, an expansion valve connected to the inlet of said evaporator, a condenser connected to the pressure side of said compressor, a tube for draining condensed moisture from the exhaust of the engine, a water tank connected to said condenser and said tube for collecting moisture therefrom, and a connection between said tank and said expansion valve to complete the refrigerating circuit.

2. In combination with a vehicle having an internal combustion engine, a water-charged refrigerating circuit comprising a compressor arranged for operation by the engine, an evaporator connected to the low pressure side of said compressor, an expansion valve connected to the inlet of said evaporator, a condenser connected to the high pressure side of said compressor, a connection between said condenser and said expansion valve to complete the refrigerating circuit, and a second compressor discharging to atmosphere and with its suction side connected into said first circuit to withdraw air therefrom.

3. In combination with a vehicle having an internal combustion engine, a water-charged refrigerating circuit comprising a compressor arranged for operation by the engine, an evaporator connected to the low pressure side of said compressor, an expansion valve connected to the inlet of said evaporator, a condenser connected to the high pressure side of said compressor, a connection between said condenser and said expansion valve to complete the refrigerating circuit, and a make-up water circuit comprising a second compressor with its suction side connected into said first circuit, a second condenser connected to the engine exhaust pipe and to the high pressure side of said second compressor, a tank for collecting moisture from said second condenser, a connection between said tank and a high pressure portion of said first circuit, a chamber in said last mentioned connection, and a float valve in said chamber controlling the admission of make-up water to said first circuit.

4. In combination with an internal combustion engine, air conditioning apparatus comprising a compressor arranged for operation by the engine, an evaporator connected to the suction side of said compressor, a condenser connected to the pressure side of said compressor, a water container connected to said condenser and said evaporator to complete the refrigerating circuit, a passage connecting said container to the engine exhaust pipe for recovering condensed moisture therefrom, and three-way valve means in said passage adapted to open a path through said passage or to close said passage and expose said collector to atmosphere to facilitate the draining of water from said container by said compressor.

GEORGE E. SELDON.

REFERENCES CITED

The following references are of record in the file of this patent:

UNITED STATES PATENTS

| Number | Name | Date |
|---|---|---|
| 1,608,982 | Hatch | Nov. 30, 1926 |
| 1,791,964 | Kleinhans | Feb. 10, 1931 |
| 1,985,636 | Foss | Dec. 25, 1934 |
| 1,987,604 | Corbett | Jan. 15, 1935 |
| 2,075,647 | Hibberd | Mar. 30, 1937 |
| 2,078,804 | McConkey | Apr. 27, 1937 |
| 2,087,411 | Lundquist | July 20, 1937 |
| 2,183,452 | Gibbs | Dec. 12, 1939 |
| 2,352,734 | Whiteley | July 4, 1944 |